A. B. RENIFF.
Water-Wheels.
No. 138,933. Patented May 13, 1873.
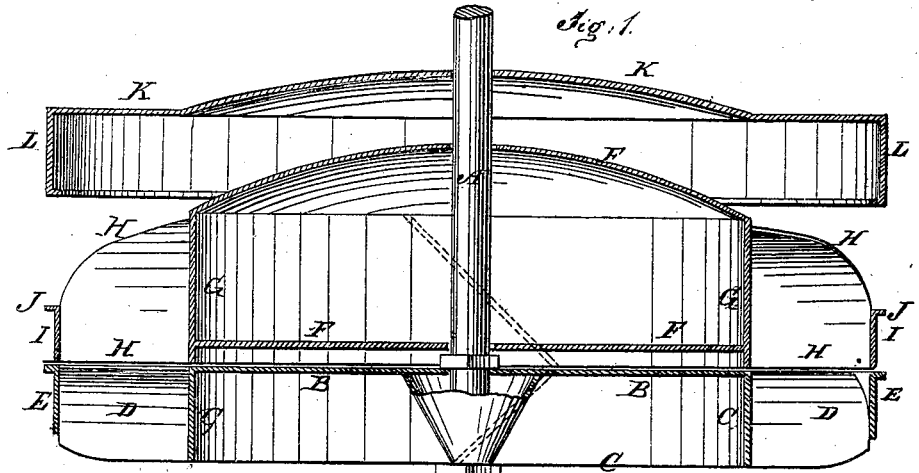
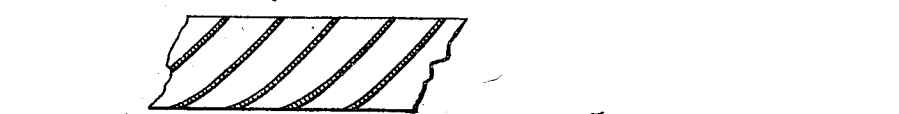
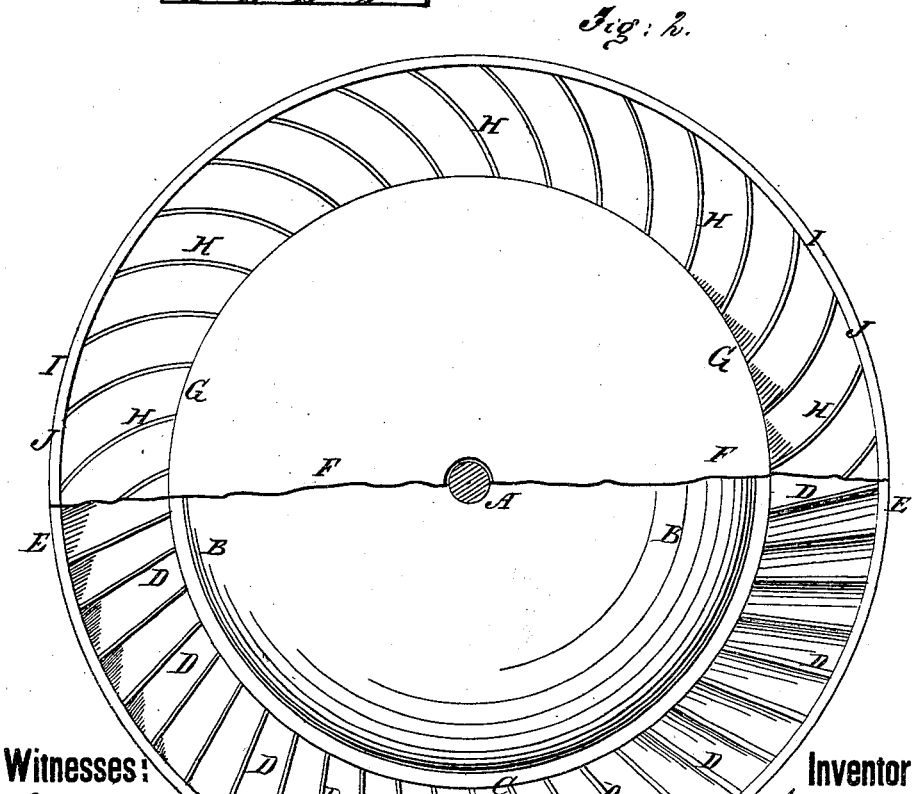
Witnesses: Inventor:

UNITED STATES PATENT OFFICE.

ALISHA B. RENIFF, OF BINGHAM'S MILLS, NEW YORK.

IMPROVEMENT IN WATER-WHEELS.

Specification forming part of Letters Patent No. 138,933, dated May 13, 1873; application filed April 19, 1873.

*To all whom it may concern:*

Be it known that I, ALISHA B. RENIFF, of Bingham's Mills, in the county of Tioga and State of New York, have invented a new and useful improvement in Water-Wheels, of which the following is a specification:

Figure 1 is a detail vertical section of my improved water-wheel. Fig. 2 is a top view of the same, the gate being removed and part of the scroll being broken away. Fig. 3 is a detail section taken through the line x x, Fig. 2.

Similar letters of reference indicate corresponding parts.

My invention has for its object to furnish an improved water-wheel, simple in construction and effective in operation, and which may be used with a very low head of water. The invention consists in the water-wheel formed of the body, inner rim, buckets, and outer rim, constructed and arranged in connection with each other, as hereinafter fully described; in the scroll or stationary-wheel formed of the body, the inner rim, the chutes, and the flanged outer rim, constructed and arranged in connection with each other and with the wheel, as hereinafter fully described; and in the gate constructed, as hereinafter described, in combination with the scroll or stationary wheel as set forth. A is the shaft, with which the wheel is connected in the ordinary manner, and from which motion is taken to the machinery to be driven. B is the body or disk of the wheel around the edge of which is formed the inner rim C. D are the buckets, the inner edges of which are secured to the inner rim C, and to their outer edges is secured the outer rim E. The buckets D are so arranged that their upper edges are about upon a tangent with the rear side of the shaft A. The buckets D incline to the rearward, and their inner side edges pass to the rearward faster than their outer side edges, and are made longer, so that their bottom edges may be horizontal. The inner rim C is made about two inches deeper than the outer rim E, which, in connection with the form of buckets, causes the wheel to discharge freely, the water, when spent, being entirely cleared from the wheel. The wheel when at work in connection with the spent water causes a suction, which renders the use of a suction-pipe wholly unnecessary. The size of the buckets and their number may be varied according as more or less power is required. F is the body of the scroll or stationary wheel, which is made convex upon its upper side and horizontal upon its lower side. G is the inner rim of the scroll. H are the chutes, the inner edges of which are secured to the inner rim G, and to their outer edges is secured the outer rim I. The outer rim I is made about six inches lower than the inner rim G. The lower edges of the chutes H are arranged about upon a tangent with the forward side of the shaft A. The chutes H are inclined in the opposite direction from the buckets D, and their upper edges are rounded off from the upper edge of the outer rim I to the upper edge of the inner rim G. The upper edge of the outer rim I has an outwardly-projecting flange, J, formed upon it, which is designed to rest upon the bottom of the flume to support the scroll. This construction of the scroll or stationary wheel allows the water to pass readily and freely into the chutes I, and enables the wheel to be run effectively with a very low head of water. K is the body of the gate, which is convexed to correspond with and fit upon the convex body F of the scroll when said gate is lowered. Around the outer edge of the body K is formed a downwardly projecting rim or flange, L, of such a depth that its lower edge may rest upon the upper edge of the outer rim I of the scroll when the said gate is lowered, so as to entirely exclude the water. The gate K L may be raised and lowered by a lever or other convenient means.

Having thus described my invention I claim as new and desire to secure by Letters Patent—

1. The water-wheel formed of the body B, inner rim C, buckets D, and outer rim E, constructed and arranged in connection with each other, substantially as herein shown and described.

2. The scroll or stationary-wheel formed of the body F, inner rim G, chutes H, and flanged outer rim I J, constructed and arranged in connection with each other and with the wheel B C D E, substantially as herein shown and described.

3. The gate K L, constructed substantially as herein shown and described, in combination with the scroll or stationary wheel F G H I J, as set forth.

ALISHA B. RENIFF.

Witnesses:
G. G. MANNING,
ADDISON ELLIS.